United States Patent
Radtke (10) Patent No.: US 7,487,849 B2
(45) Date of Patent: Feb. 10, 2009

(54) THERMALLY STABLE DIAMOND BRAZING

(76) Inventor: Robert P. Radtke, 2103 River Falls Dr., Kingwood, TX (US) 77339

( * ) Notice: Subject to any disclaimer, the term of this patent is extended or adjusted under 35 U.S.C. 154(b) by 175 days.

(21) Appl. No.: 11/130,036

(22) Filed: May 16, 2005

(65) Prior Publication Data

US 2006/0254830 A1 Nov. 16, 2006

(51) Int. Cl.
*E21B 10/36* (2006.01)

(52) U.S. Cl. ............... 175/434; 175/435; 175/420.2; 175/426

(58) Field of Classification Search ........... 175/434, 175/435, 426, 420.2
See application file for complete search history.

(56) References Cited

U.S. PATENT DOCUMENTS

| | | | |
|---|---|---|---|
| 3,745,623 | A | 7/1973 | Wentorf, Jr. et al. |
| 4,104,344 | A | 8/1978 | Pope et al. |
| 4,288,248 | A | 9/1981 | Bovenkerk et al. |
| 4,340,650 | A | 7/1982 | Pattanaik et al. |
| 4,539,018 | A * | 9/1985 | Whanger et al. ......... 51/295 |
| 4,931,363 | A * | 6/1990 | Slutz et al. ............ 428/408 |
| 5,049,164 | A | 9/1991 | Horton et al. |
| 5,186,268 | A | 2/1993 | Clegg |
| 5,494,477 | A | 2/1996 | Flood et al. |
| 5,662,720 | A | 9/1997 | O'Tighearnaigh |
| 6,054,693 | A | 4/2000 | Barmatz et al. |

FOREIGN PATENT DOCUMENTS

WO WO-00/34001 6/2000

OTHER PUBLICATIONS

Combined Search and Examination Report issued in Application No. GB0609707.5 dated Sep. 18, 2006 (6 pages).
Metals Handbook Commitee, Metals Handbook, 8th Ed, vol. 1, Properties and Selection of Metals, Ohio.
Michael R. Lindeburg, P.E., Engineer-In-Training Reference Manual, 8th Edition, California.
Theodore Baumeister, Standard Handbook For Mechanical Engineers, 7th Ed.

* cited by examiner

*Primary Examiner*—William P Neuder
*Assistant Examiner*—Nicole Coy
(74) *Attorney, Agent, or Firm*—Bruce A. Jagger (57) ABSTRACT

A cutting element and a method for forming a cutting element is described and shown. The cutting element includes a substrate, a TSP diamond layer, a metal interlayer between the substrate and the diamond layer, and a braze joint securing the diamond layer to the substrate. The thickness of the metal interlayer is determined according to a formula. The formula takes into account the thickness and modulus of elasticity of the metal interlayer and the thickness of the TSP diamond. This prevents the use of a too thin or too thick metal interlayer. A metal interlayer that is too thin is not capable of absorbing enough energy to prevent the TSP diamond from fracturing. A metal interlayer that is too thick may allow the TSP diamond to fracture by reason of bending stress. A coating may be provided between the TSP diamond layer and the metal interlayer. This coating serves as a thermal barrier and to control residual thermal stress.

15 Claims, 7 Drawing Sheets

PRIOR ART

THERMALLY STABLE DIAMOND BRAZING

This invention was made with government support under contract #DE-FC26-97FT34368 awarded by the Department of Energy. The government has certain rights in this invention.

BACKGROUND OF INVENTION

1. Field of the Invention

The invention relates generally to drill bits which have polycrystalline diamond compact cutters thereon.

2. Background Art

Polycrystalline diamond compact (PDC) cutters have been used in industrial applications including wellbore drilling and metal machining for many years. In these applications, a compact of polycrystalline diamond (or other superhard material such as cubic boron nitride) is bonded to a substrate material, which is typically a sintered metal-carbide, to form a cutting structure. A compact is a polycrystalline mass of diamonds (typically synthetic) that are bonded together to form an integral, tough, high-strength mass.

Figure 1:
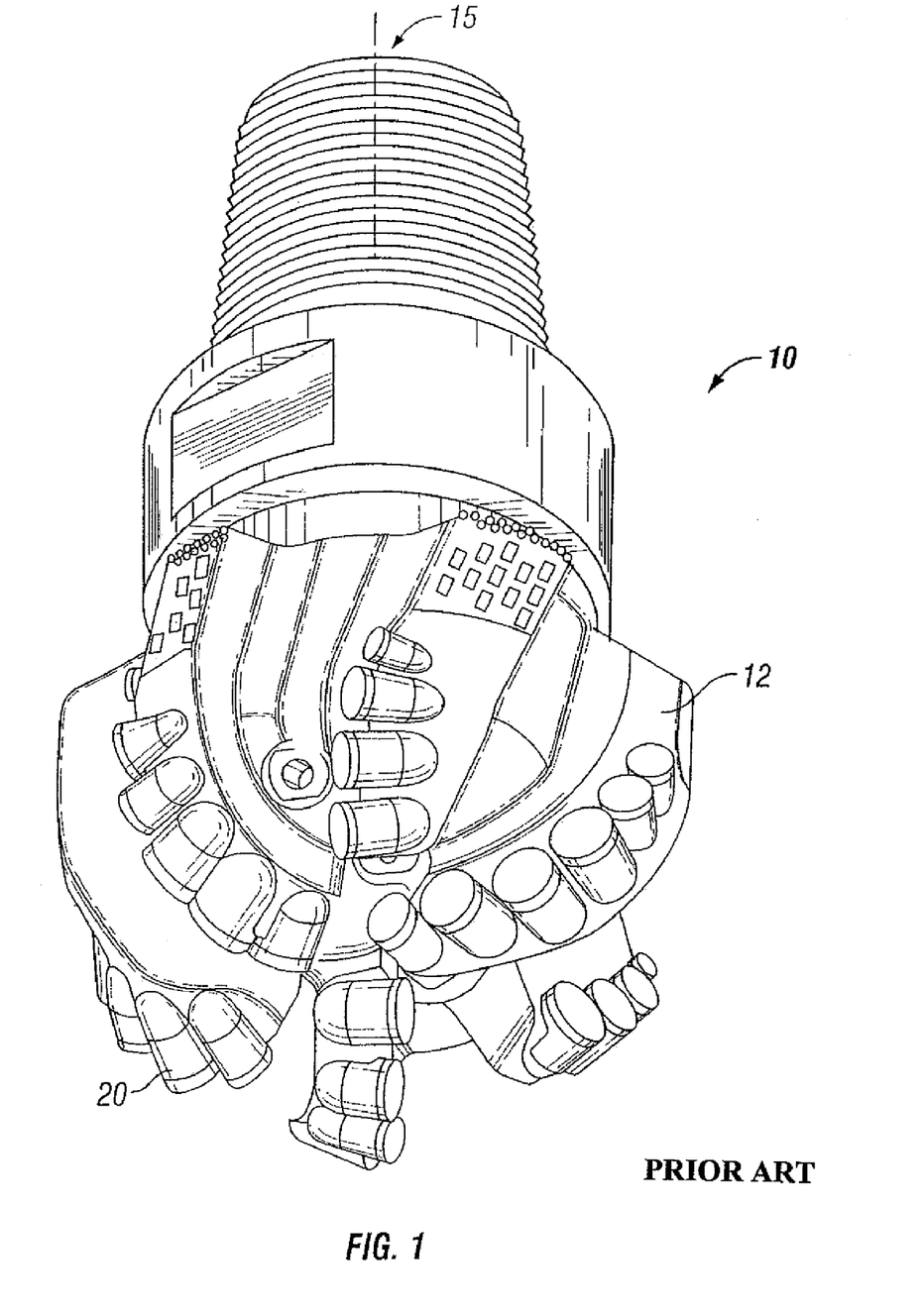
FIG. 1 is an illustration of a PDC drill bit.

An example of a use of PDC cutters is in a drill bit for earth formation drilling is disclosed in U.S. Pat. No. 5,186,268. FIG. 1 in the '268 patent shows a cross-section of a rotary drill bit having a bit body 10. A lower face of the bit body 10 is formed to include a plurality of blades (blade 12 is shown in FIG. 1) that extend generally outwardly away from a rotational axis 15 of the drill bit. A plurality of PDC cutters 20 are disposed side by side along the length of each blade. The number of PDC cutters 20 carried by each blade may vary. The PDC cutters 20 are affixed to a stud-like carrier, which may also be formed from tungsten carbide, and is received and secured within a corresponding socket in the respective blade.

Figure 2:
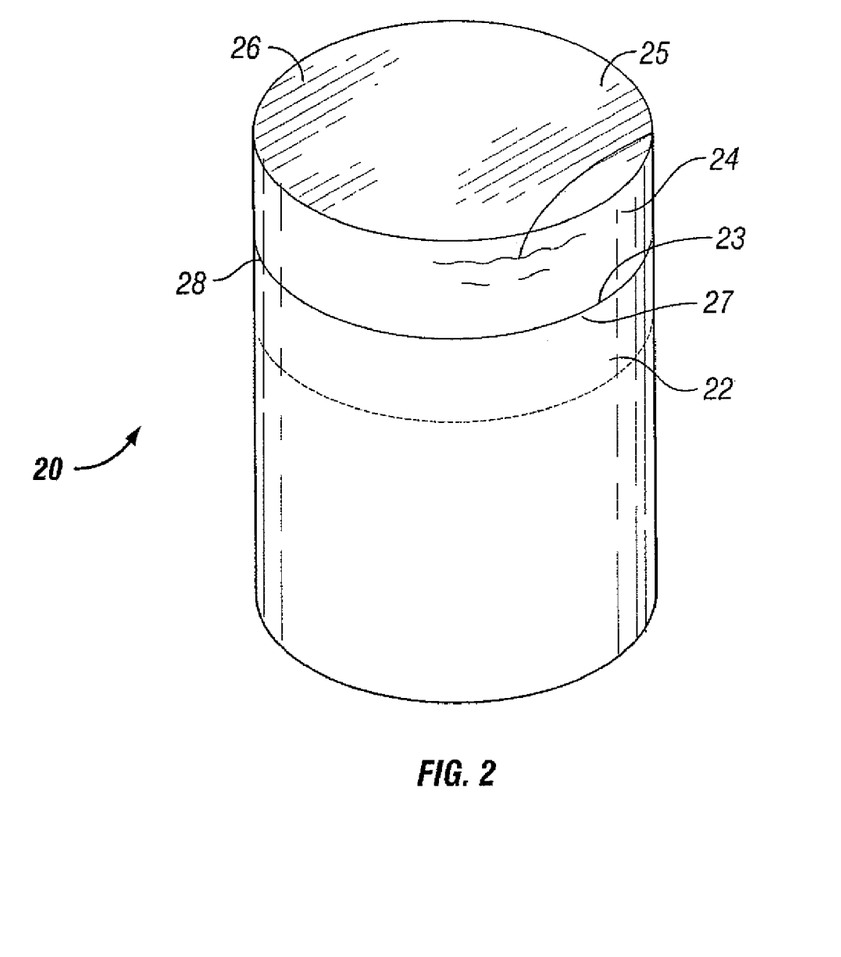
FIG. 2 is an illustration of a PDC cutting element.

A typical cutter 20 is shown in FIG. 2. The typically cutter 20 has a cylindrical cemented carbide substrate body 22 having an end face or upper surface 23 referred to herein as the "interface surface" 23. An ultra hard material layer (cutting layer) 24, such as polycrystalline diamond or polycrystalline cubic boron nitride layer, forms the working surface 25 and the cutting edge 26. A bottom surface 27 of the cutting layer 24 is bonded on to the upper surface 23 of the substrate 22. The joining surfaces 23 and 27 are herein referred to as the interface 28. The top exposed surface or working surface 25 of the cutting layer 24 is opposite the bottom surface 27. The cutting layer 24 typically may have a flat or planar working surface 25, or a non-planar surface (not shown separately).

Drill bits using conventional PDC cutters are sometimes unable to sustain a sufficiently low wear rate at the cutter temperatures generally encountered while drilling in abrasive and hard rock. These temperatures may affect the bit life, especially when the temperatures reach 700-750° C., resulting in structural failure of the PDC cutting layer. A PDC cutting layer includes individual diamond "crystals" that are interconnected. The individual diamond crystals thus form a lattice structure. A metal catalyst, such as cobalt may be used to promote recrystallization of the diamond particles and formation of the lattice structure. Thus, cobalt particles are typically found within the interstitial spaces in the diamond lattice structure. Cobalt has a significantly different coefficient of thermal expansion as compared to diamond. Therefore, upon heating of a diamond table, the cobalt and the diamond lattice will expand at different rates, causing cracks to form in the lattice structure and resulting in deterioration of the diamond table.

In order to obviate this problem, strong acids may be used to "leach" the cobalt from the diamond lattice structure. Examples of "leaching" processes can be found, for example, in U.S. Pat. Nos. 4,288,248 and 4,104,344. Briefly, a hot strong acid, e.g., nitric acid, hydrofluoric acid, hydrochloric acid, or perchloric acid, or combinations of several strong acids may be used to treat the diamond table, removing at least a portion of the co-catalyst from the PDC layer. By leaching out the cobalt, a thermally stable polycrystalline (TSP) diamond layer is formed.

Alternatively, TSP may be formed by forming the diamond layer in a press using a binder other than cobalt, one such as silicon, which has a coefficient of thermal expansion more similar to that of diamond than cobalt has. During the manufacturing process, a large portion, 80 to 100 volume percent, of the silicon reacts with the diamond lattice to form silicon carbide which also has a thermal expansion similar to diamond. Upon heating, any remaining silicon, silicon carbide, and the diamond lattice will expand at more similar rates as compared to rates of expansion for cobalt and diamond, resulting in a more thermally stable layer. PDC cutters having a TSP cutting layer have relatively low wear rates, even as cutter temperatures reach 1200° C.

Thus, the methods for securing TSP to a rigid substrate for use in drill bit cutters have been actively investigated. In the attachment of PDC to a substrate, cobalt typically plays a significant role to bond the diamond to the substrate. However, because TSP is made by removing cobalt from the diamond layer, attachment of TSP to the substrate is significantly more complicated, as compared to the attachment of PDC to a substrate.

Brazing a TSP disc to a rigid substrate, having a relatively high modulus of elasticity, such as cobalt bonded tungsten carbide or molybdenum, may improve the performance of the TSP cutting elements, as compared to the performance of TSP cutting elements not having a rigid substrate. In the brazing process, a braze filler interlayer is positioned between the diamond layer and the substrate. The interlayer is melted and, upon subsequent solidification, is bonded to the diamond component and the substrate forming a braze joint. One braze filler metal composition that has been used to secure TSP to a substrate is a TiCuAg braze alloy. When using this composition, all components are heated slowly to 800-900° C. and melted to form discontinuous two-phase micro structures. Higher braze temperatures (such as over 1200° C.) cannot be used without resulting in TSP damage. Average shear strengths of the braze layer ranging from 20,000 to 35,000 psi have been achieved using direct resistance, induction and furnace heating methods. Most commercially available braze alloys result in a maximum shear strength of 35,000 psi.

The differential in the coefficients of thermal expansion between the substrate and the diamond layer often results in thermal residual stress. To minimize problems caused by thermal residual stress, a metal interlayer is included between two braze foils to control these stresses. See Ref. Brazing Handbook, American Welding Society, Ch. 30 Carbide Tools, 406 (1991). The thickness of the metal interlayer is typically about 50% of the entire joint thickness: for example, a 0.004 inches metal layer sandwiched between two 0.002 braze foils. U.S. Pat. No. 5,049,164 includes metallic bonding layers between tungsten and copper layers, which serve as a coating for bonding polycrystalline diamond to a matrix. The metallic bonding interlayers are taught to preferably be between 1.0 and 3.0 microns thick.

Cutter failure also results with fractures in the diamond layer caused by mechanical affects. Two of the mechanical affects which may lead to such fracture include vibration and impact, which may be termed "chatter." Chatter can be defined as vibration with an amplitude that exceeds the depth of the cut. It may cause cutter damage via microfracture and reduce the rate of penetration of drilling. The vibrating chatter can cause a wavy surface on the bottom hole profile. When the wave of the leading cutter matches a trailing cutter, the cutting thickness is constant and results in a smoother cutting action. If the waves are out of sync, the chip thickness varies, and the regenerative vibration causes chatter. Chatter may be controlled by maintaining a constant chip thickness and by absorbing or redirecting the energy that generates chatter.

While these prior art methods provide satisfactory attachment of PDC or TSP to a substrate, there still exists a need for methods for attachment of TSP to a substrate with a stronger joint and an improved shear strength with reduced cracking in the cutting elements.

SUMMARY OF INVENTION

In one aspect, the present invention relates to a cutting element that includes a substrate, a TSP diamond layer, a metal interlayer between the substrate and the diamond layer, and a braze joint securing the diamond layer to the substrate, wherein the braze joint has a shear strength greater than about 60,000 psi.

In another aspect, the present invention relates to a cutting element that includes a substrate, a TSP diamond layer, a metal interlayer, and a braze joint interposed between the substrate and the TSP diamond layer, wherein the braze joint secures the TSP diamond layer to the substrate following a heat treatment cycle, wherein the heat treatment cycle includes a rapid heat step, a gradual heat step, and a gradual cool step.

In yet another aspect, the present invention relates to a method of forming a cutting element, including the steps of providing a coaxial stack that includes a substrate, a TSP diamond table, and a braze foil between the substrate and the TSP diamond table, rapidly heating the stack to a first exposure temperature, gradually heating the stack to a second exposure temperature, and gradually cooling the stack from the second exposure temperature.

In yet another aspect, the present invention relates to a method of forming a cutting element having a TSP diamond layer, a substrate and a metal interlayer between the diamond layer and the substrate that includes the steps of selecting a thickness of the TSP diamond layer, selecting a metal for the metal interlayer having a modulus of elasticity, determining a thickness for the metal interlayer according to:

$$t_m \approx \frac{1.05 * 10^6}{\lambda} * \frac{t_d}{.14},$$

wherein $t_m$ is the thickness of the metal interlayer in inches, $t_d$ is the thickness of the diamond layer in inches, and $\lambda$ is the modulus of elasticity of the metal in pounds per square inch (psi).

It is apparent that a thinner metal interlayer or no interlayer can be used for drilling applications with minimal chatter. Other aspects and advantages of the invention will be apparent from the following description and the appended claims.

DETAILED DESCRIPTION

In one aspect, embodiments of the invention relate to a cutting element having a diamond layer brazed to a substrate. In particular, embodiments relate to a cutting element having a braze joint with a high shear strength. Moreover, embodiments relate to a method for forming such cutting elements.

Figure 3:
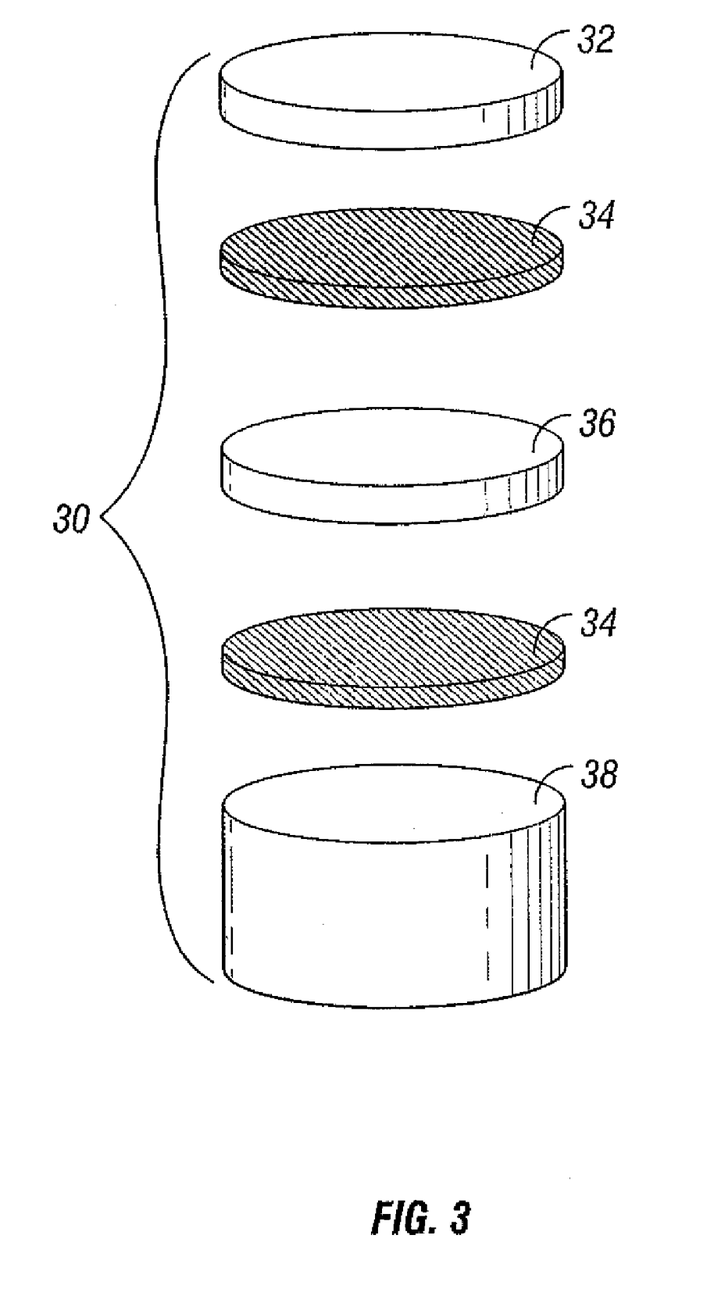
FIG. 3 is an illustration of a cutter assembly according to one embodiment of the present invention.

Referring to FIG. 3, a cutter assembly is shown used to make a cutting element according to one embodiment of the present invention. The cutter assembly 30 includes a co-axial stack of a TSP diamond layer 32, braze layers 34, a metal interlayer 36, and a substrate 38. Upon treatment of the cutter assembly 30, a cutting element may be formed when the braze layers 34 are melted and join together the TSP diamond layer 32, the metal interlayer 36, and the substrate 38, forming a braze joint (not shown separately). It may become apparent to anyone skilled in the art that these metal interlayers 36 become effective shock absorbing materials that can be applied to all cutting elements, including PDC diamond drill bit cutters, PCD machine tool cutters, roller bit carbide inserts, percussion bit carbide inserts, coal mining picks, and other cutting tools where chatter is a limiting factor to performance.

As used herein, a TSP diamond layer refers to a diamond layer that is able to withstand relatively high temperatures. A TSP diamond layer may be formed as known in the art, including a partial or complete leaching process and by using a binder other that cobalt. While the above description lists several methods of forming TSP diamond, no limitation is intended on the scope of the invention by such a description.

In one embodiment, the cutting element includes a TSP diamond layer secured to a substrate by a braze joint. In one embodiment, the braze joint may have a shear strength greater than about 60,000. In other embodiments, the braze joint may have a shear strength greater than about 80,000 psi.

In another embodiment of the present invention, the cutting element includes a TSP diamond layer secured to a substrate by a braze joint, where the braze joint is formed following a heat treatment cycle. The heat treatment cycle may include a rapid heat step, a temperature hold step, a gradual heat step, and a gradual cool step.

According to some embodiments of the present invention, the braze joint may comprise a NiPdCr braze alloy. In some embodiments, the ratio of the content of Pd to the content of Ni is fixed and may range from 0.4 to 0.8. It is within the scope of the present invention that the braze alloy may contain other trace elements. In some embodiments, the braze joint has a thickness less than about 0.003 inches.

One suitable braze alloy for securing a diamond layer to a substrate is sold under the trade name, PALNICRO 36M (WESGO Metals, Hayward, Calif.) and is comprised of Ni, Pd, Cr, B, and Si. This braze alloy includes 36% Pd, 10.5% Cr, 3% B, 0.5% Si, and a balance of Ni. Another suitable braze alloy is sold under the trade name, PALNICRO 30 (WESGO, Hayward, Calif.). PALNICRO 30 includes 30% Pd, 10.5%

Cr, 2.4% B and a balance of Ni. References to the use of PALNICRO 36 and PALNICRO 30 are for illustrative purposes and no limitation on the braze alloy is intended.

According to other embodiments of the present invention, braze joint may comprise a braze alloy including at least one or more elements selected from the group consisting of Cr, Fe, Si, C, B, P, Mo, Ni, Co, W, and Pd. Other suitable braze alloys are sold by METGLAS (Metglas, Inc. Conway, S.C.). One suitable braze alloy is sold under the trade name, MBF 15.

The braze interlayer used to form the braze joint may be in the form of a foil or screen shaped in accordance with the shape of the diamond disk and substrate to be joined. The braze interlayer may be fabricated to have uneven, raised areas that create microscopic peaks and valleys on the interlayer. These raised areas may allow localized melting of the interlayer by reducing heat transfer to the diamond layer and the substrate until a part of the braze interlayer has melted.

In other embodiments, the cutting element may include a metal interlayer between the TSP diamond layer and the substrate. The metal interlayer may be sandwiched between two braze foils to form the braze joint. In one embodiment, the metal interlayer is a Ni layer. In another embodiment, the metal interlayer is a Mo layer. The metal interlayer may be of a suitable thickness to provide a shock absorbing ability to the cutting element. The shock absorbing capacity of the metal interlayer may be related to the thickness of the metal interlayer and the modulus of elasticity of the particular metal that comprises the metal interlayer. The capacity may also be dependent upon the thickness of the diamond layer. Through experimentation, the present inventors have optimized the thickness of the metal to provide a desired shock absorbing behavior. This optimized thickness may be determined according to:

$$t_m \approx \frac{1.05 * 10^6}{\lambda} * \frac{t_d}{.14},$$

wherein $t_m$ is the thickness of the metal interlayer in inches, $t_d$ is the thickness of the diamond layer in inches, and $\lambda$ is the modulus of elasticity of the metal in pounds per square inch (psi).

According to one embodiment of the present invention, a cutting element may be formed by selecting a thickness of the TSP diamond layer, selecting a metal for the metal interlayer having a modulus of elasticity, and determining a thickness for the metal interlayer according to:

$$t_m \approx \frac{1.05 * 10^6}{\lambda} * \frac{t_d}{.14},$$

wherein $t_m$ is the thickness of the metal interlayer in inches, $t_d$ is the thickness of the diamond layer in inches, and $\lambda$ is the modulus of elasticity of the metal in pounds per square inch (psi).

In one example of an embodiment of the present invention, the TSP diamond layer may have a thickness of about 0.140 inches, and a Mo interlayer may have a thickness of about 0.019 inches. In another example, the diamond layer may have a thickness of about 0.140 inches, and a Ni interlayer may have a thickness of about 0.035 inches. Examples of suitable thicknesses of various metal interlayers are shown in Table 1. The metal interlayer may be joined according to any brazing method according to other embodiments of the present invention.

TABLE 1

| Interlayer | Modulus of Elasticity (psi) | k | Interlayer Thickness for 0.14" Thick Diamond | Interlayer Thickness for 0.10" Thick Diamond |
|---|---|---|---|---|
| Tungsten | 56,000,000 | 1050000 | 0.019 | 0.013 |
| Molybdenum | 45,000,000 | 1050000 | 0.023 | 0.017 |
| Nickel | 30,000,000 | 1050000 | 0.035 | 0.025 |
| SS430 | 29,000,000 | 1050000 | 0.036 | 0.026 |
| Tantalum | 27,000,000 | 1050000 | 0.039 | 0.028 |
| INVAR | 20,000,000 | 1050000 | 0.053 | 0.038 |
| Titanium | 15,000,000 | 1050000 | 0.070 | 0.050 |
| Niobium | 15,000,000 | 1050000 | 0.070 | 0.050 |
| Zirconium | 11,000,000 | 1050000 | 0.095 | 0.068 |

According to some embodiments of the present invention, the TSP diamond layer may have the cobalt binder partially leached out. The partial leaching forms a gradient of cobalt, with the percentage of cobalt increasing from the outer surface of the TSP diamond layer inward.

According to some embodiments of the present invention, the substrate may have a non-planar interface. One example of a non-planar interface between a carbide substrate and a diamond layer is described, for example, in U.S. Pat. No. 5,662,720, wherein an "egg-carton" shape is formed into the substrate by a suitable cutting, etching, or molding process. Other non-planar interfaces may also be used, for example, the interface described in U.S. Pat. No. 5,494,477. The substrate surface may be, for example, a sintered metal-carbide, such as tungsten carbide as in previous embodiments.

In some embodiments of the present invention, the TSP diamond layer comprises a coating. The coating may act as a thermal barrier between a diamond layer and a braze interlayer alloy. In one embodiment, the coating includes Mo, Si, and C. In other embodiments, the coating includes a non-saturated $Mo_5Si_3$ carbide ($MQ_5Si_3C_{1-x}$ carbide). The coating composition is preferably deficient in carbon so that the coating may react with the diamond layer to form an adherent coating on TSP. In other embodiments, the coating may be selected from Ti, Cr, Ta, or Groups IV, V, and VI, and Ru, or rare earth elements in Groups VII and VIII of the Periodic Table that are carbide forming metals. Ru is preferred because of its relatively low cost. Alloys of these elements may also be used. For example alloys of ReIr are known to provide a superior diffusion layer at elevated temperatures. To assure adhesion of the coating to the diamond, a pre-braze thermal treatment may be necessary. For example, the tungsten coating requires a one hour heat treatment in a controlled atmosphere furnace for one hour at 850 degrees centigrade. Examples of coatings deposited on a TSP diamond layer are described in U.S. Pat. No. 5,049,164.

Figure 4:
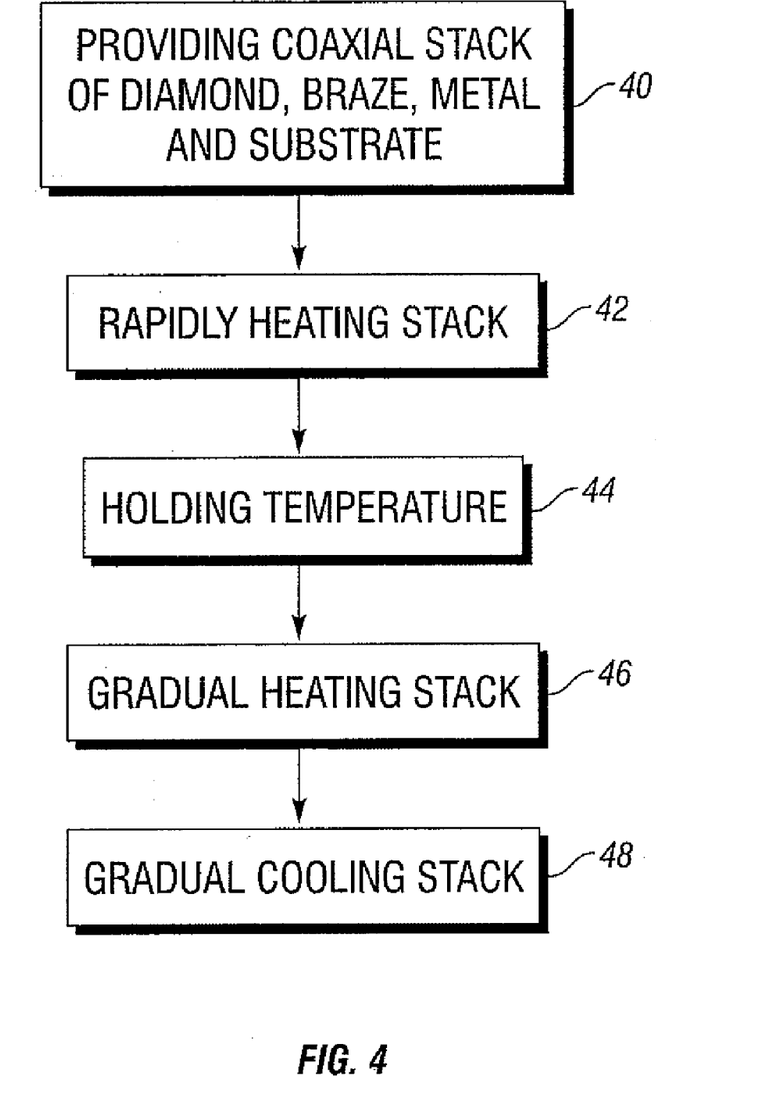
FIG. 4 is a flowchart according to one embodiment of the present invention.

Some embodiments of the invention relate to methods for making cutting elements. A method for making a cutting element according to one embodiment of the present invention is described in FIG. 4. As shown in FIG. 4, a co-axial stack consisting of a diamond table, a substrate, and a braze interlayer between the diamond table and the substrate is provided (step 40). The stack is rapidly heated to a first exposure temperature (step 42) and may optionally be held at that first exposure temperature (step 44). From the first exposure temperature, the stack is gradually heated to a second exposure temperature (step 46). The stack is then gradually cooled down from the second exposure temperature (step 48).

Upon the application of the heat cycle described in FIG. 4, the braze interlayer may melt, wetting both the diamond table and the substrate.

In some embodiments, the heating cycle and heating steps according to some embodiments of the present invention may uses a heat source selected from the group brazing heating methods consisting of torch brazing, microwave brazing, induction brazing, electron and laser beam brazing, blanket brazing resistance brazing, infrared brazing, exothermic brazing, and furnace brazing. In other embodiments, the preferred heating cycle and heating steps may use microwave brazing. U.S. Pat. No. 6,054,693, which is herein incorporated by reference, describes a microwave brazing process. A typical microwave system includes a generator, a waveguide, an applicator, and a control system. The generator produces the microwaves which are transported by the waveguide to the applicators (typically in the form of a cavity) where they are manipulated for the desired purpose. Microwave systems may be single or multimode.

Figure 5:
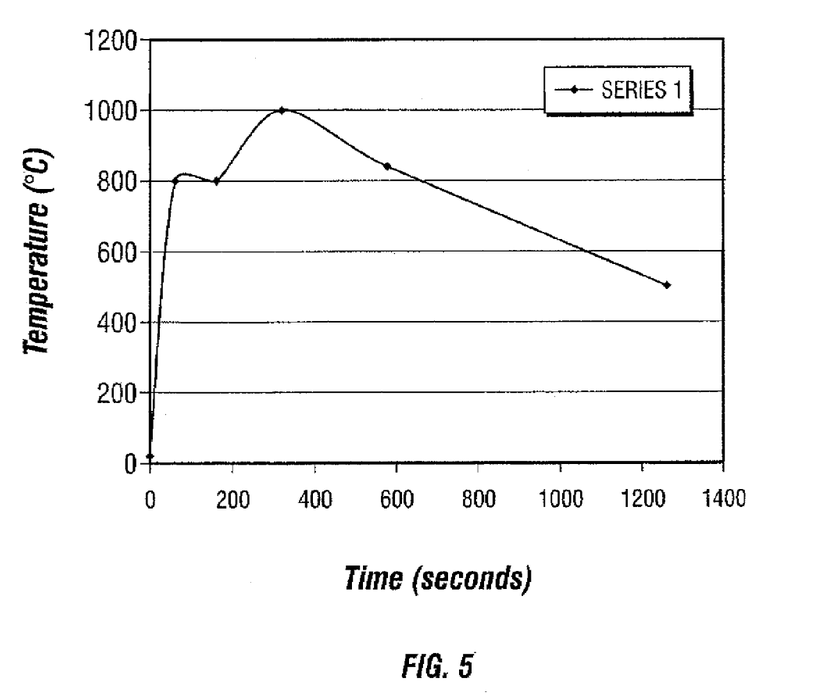
FIG. 5 is an illustration of a heating cycle according to one embodiment of the present invention.

One example of a heat treatment cycle according to some embodiments of the present invention is shown in FIG. 5. FIG. 5 shows a rapid heating step to achieve 800° C. in about 60 seconds. The temperature is then held at 80020 C. for a slightly longer period of time (about 120 seconds). A gradual heating process brings the temperature to 1000° C., which is typically 20 to 50° C. above the liquidus temperature of the braze filler metal, in about 180 seconds. The temperature cycle is so designed to achieve a total time above the solidus temperature of 300 to 600 seconds. At about the solidus temperature or when the maximum thermal residual stresses occur, the temperature is gradually lowered at a rate of no greater than about 40° C./min.

FIG. 5 shows one example of a heating cycle in accordance with one embodiment of the present invention. One of ordinary skill in the art would appreciate that variation are possible without departing from the scope of the invention. For example, the initial fast ramping to the first high temperature may occur with a speed of from 100° C./min to 800° C./min. The first high temperature may be from about 700° C. to 850° C. In some embodiments, the first temperature may be held for a duration in a range from about 0 sec to 150 sec. The subsequent gradual heating to the second high temperature may occur with a speed of from 75° C./min to 400° C./min. In other embodiments, the first and second heating steps may be at equal heating rates. The second high temperature may be from about 960° C. to 1010° C. Attachment shear strength is dependent on the time above the solidus temperature, which is optimized by controlling the temperature cycle to attain about 300 to 600 seconds. In one embodiment, the gradual cooling may occur with a speed of from 20° C./min to 40° C./min. In other embodiments, the gradual cooling may occur with a speed of less than 100° C./min. In some embodiments, the time above solidus may range from about 300 seconds to about 600 seconds.

Figure 6:
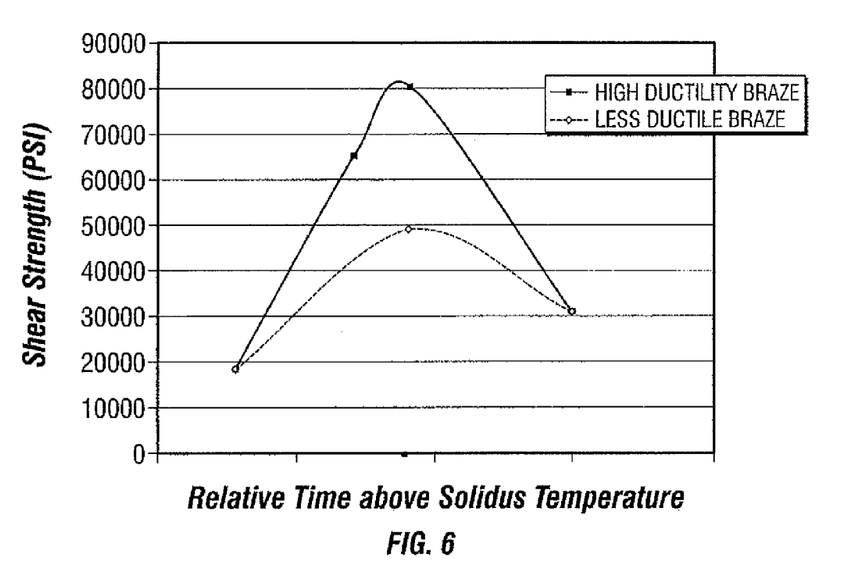
FIG. 6 is a graph representing the effect of ductility on shear strength.
Figure 7:
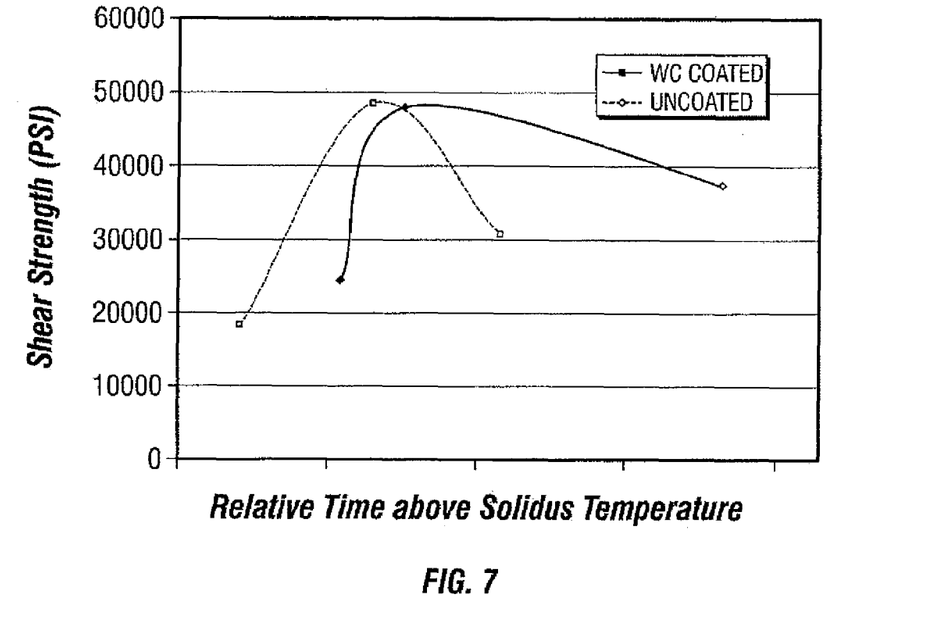
FIG. 7 is a graph representing the effect of a coating according to one embodiment of the present invention on shear strength.

Steps may also be taken to melt certain phases from the braze filler metal in order to remove any low melting, brittle phases from the braze material so as to form a braze joint having a higher shear strength. The effect of the removal of these brittle phases is shown in FIG. 6. Using the Palnicro®36M material described above as a braze filler metal, chrome may react with diamond to form a carbide. By coating the diamond layer with a carbide forming element, the time above solidus range for braze joints having a high shear strength may be extended, as shown in FIG. 7.

The coaxial stack of the diamond table, the braze interlayer and the substrate may be placed in a sample holder, such as a cylindrical quartz tube, to maintain approximate alignment of the layers during the brazing process. Some tubes include at least three quartz fingers to maintain alignment. The quartz tubes are preferably 0.5-2.0 mm larger than the outer diameter of the components. Preferably, the tubes also allow a gap between the tube and the components near the braze line to be wide enough to insure that capillary action does not cause an extraction of excessive amount of molten braze material out of the joint during processing.

Each of the components in the coaxial stack may be cylindrically shaped without being about the same diameter. The braze interlayer is typically thinner than either the diamond table or the substrate. The substrate may be comprised of a refractory hard metal, or a metal such as molybdenum, or a composite of a refractory hard metal and a metal. Such refractory hard metals may include carbides, borides, and silicides that are high temperature materials. Typically, the substrate includes a tungsten carbide grains supported within a metallic binder, such as cobalt. It is well known that various metal compositions and/or binders may be used. Thus, references to the use of tungsten carbide and cobalt are for illustrative purposes only, and no limitation on the type of substrate or binder is intended. It should also be understood that a cutting element according to embodiments of the invention may also include a TSP diamond layer brazed to a metal interlayer and set in a matrix-type drill bit.

Advantages of the embodiments of the invention may include one or more of the following. Braze joints having higher shear strengths may be achieved. An improved cutting element allows for the ability of the braze filler metal to create sufficient attachment shear strength at high temperatures to withstand the operational forces on cutting elements, which create cutter temperatures in excess of 500° C. The cutting element may withstand high cutter temperatures when drilling hard and abrasive rock at high linear cutter speeds and rates of penetration. The heat cycle may also allow for the removal of any lower melting point elements that can reduce the ductility of the braze composition. Additionally, the braze joint may have a higher re-melt temperature than melt temperature, allowing the cutter to withstand higher temperatures without cutter failure.

The coating on the braze interlayer may act as a diffusion barrier between the diamond and braze filler metal. The coating also may also act as an insulator to increase the desirable delta temperature between the diamond and tungsten carbide while brazing. The coating may further act to control residual thermal stress; which can cause the diamond to crack on cooling.

The metal interlayer may reduce the amount of fracture to a cutting element such that diamond fracture may result if the metal interlayer does not provide shock absorbance. If the metal interlayer is too thin, diamond fracture may result because there is not enough energy absorbed by the metal interlayer. If the metal interlayer is too thick, diamond fracture may result because the elasticity of the metal interlayer may allow the diamond layer to be under bending stresses and susceptible to fracture.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A cutting element, comprising:
 a substrate;
 a cutting surface comprising a TSP diamond layer;

a metal interlayer between said substrate and said TSP diamond layer, wherein said metal interlayer has a thickness selected according to:

$$t_m \approx \frac{1.05*10^6}{\lambda} * \frac{t_d}{.14},$$

wherein, $t_m$ is the thickness of said metal interlayer, $t_d$ is the thickness of said TSP diamond layer, and $\lambda$ is the modulus of elasticity of said metal interlayer; and a braze joint securing said TSP diamond layer to said substrate, said braze joint having a shear strength greater than about 80,000 psi.

2. The cutting element of claim 1, wherein said metal interlayer comprises tungsten, molybdenum, nickel, SS430, tantalum, INVAR, titanium, niobium, or zirconium.

3. The cutting element of claim 1, wherein said braze joint has a thickness less than about 0.003 inches.

4. The cutting element of claim 1, wherein said braze joint comprises a NiPdCr braze alloy.

5. The cutting element of claim 1, wherein said braze joint comprises a braze alloy comprising at least one or more elements selected from the group consisting of Cr, Fe, Si, C, B, P, Mo, Ni, Co, W, and Pd.

6. The cutting element of claim 1, further comprising a $MO_5Si_3C_{1-x}$ carbide coating between said TSP diamond layer and said braze joint.

7. The cutting element of claim 1, further comprising a coating between said TSP diamond layer and said braze joint, wherein said coating comprises a metal selected from the group consisting of Ru, W, and Ta.

8. The cutting element of claim 1, wherein said metal interlayer comprises a metal selected from the group consisting of Mo and Ni.

9. The cutting element of claim 1, further comprising a coating between said TSP diamond layer and the braze joint, said coating being a thermal barrier between said TSP diamond layer and said braze joint.

10. A cutting element, comprising:
a substrate;
a cutting surface comprising a TSP diamond layer;
a shock absorbing interlayer between said substrate and said TSP diamond layer, wherein said shock absorbing interlayer has a thickness, said thickness being about:

$$t_m \approx \frac{1.05*10^6}{\lambda} * \frac{t_d}{.14},$$

wherein, $t_m$ is the thickness of said shock absorbing interlayer, $t_d$ is the thickness of said TSP diamond layer, and $\lambda$ is the modulus of elasticity of said shock absorbing interlayer.

11. The cutting element of claim 10, further comprising a braze joint interposed between said substrate and said TSP diamond layer, a coating between said TSP diamond layer and said braze joint, said coating being adapted to being a thermal barrier between said TSP diamond layer and said braze joint.

12. The cutting element of claim 10, further comprising a braze joint interposed between said substrate and said TSP diamond layer, a coating between said TSP diamond layer and said braze joint, said coating being adapted to control residual thermal stress.

13. The cutting element of claim 10, further comprising a braze joint interposed between said substrate and said TSP diamond layer, wherein said braze joint has a shear strength of greater than about 60,000 psi.

14. The cutting element of claim 10, wherein said metal interlayer comprises tungsten, molybdenum, nickel, SS430, tantalum, INVAR, titanium, niobium, or zirconium.

15. A cutting element, comprising:
a substrate;
a cutting surface comprising a TSP diamond layer; and
a metal interlayer between said substrate and said TSP diamond layer, said metal interlayer having a thickness that it is adapted to absorbing enough energy to prevent said TSP diamond layer from fracturing without subjecting said TSP diamond layer to bending stress, said thickness being about $$t_m \approx \frac{1.05*10^6}{\lambda} * \frac{t_d}{.14},$$

wherein, $t_m$ is the thickness of said metal interlayer, $t_d$ is the thickness of said TSP diamond layer, and $\lambda$ is the modulus of elasticity of said metal interlayer.

* * * * *